Dec. 2, 1941.    F. W. LEE    2,264,318
GEOPHYSICAL SURVEYING
Filed April 8, 1938    2 Sheets-Sheet 1
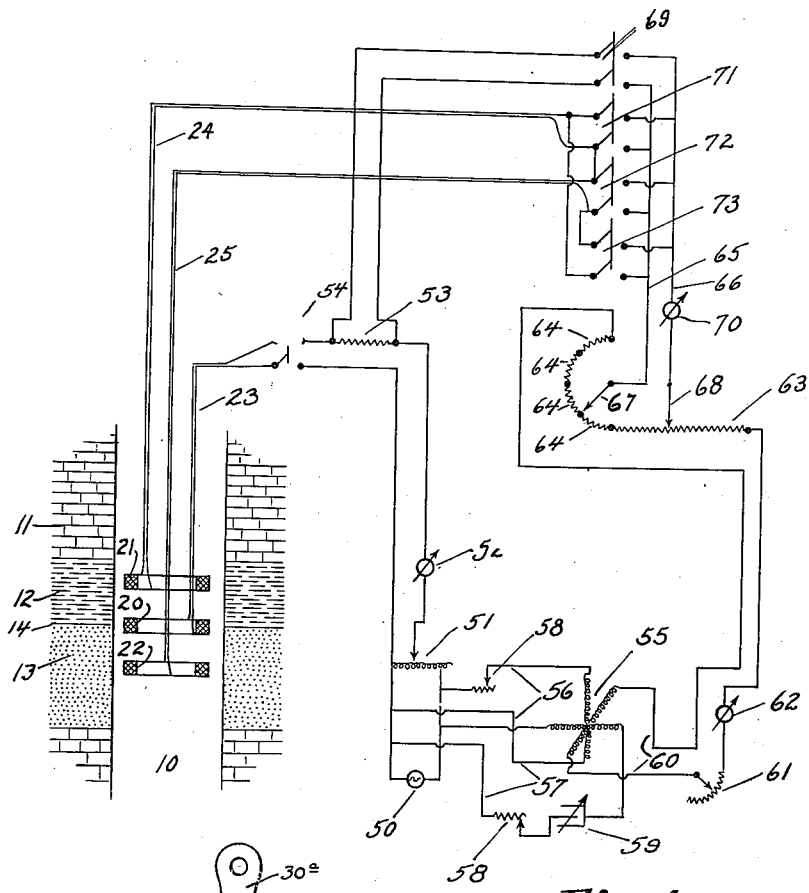
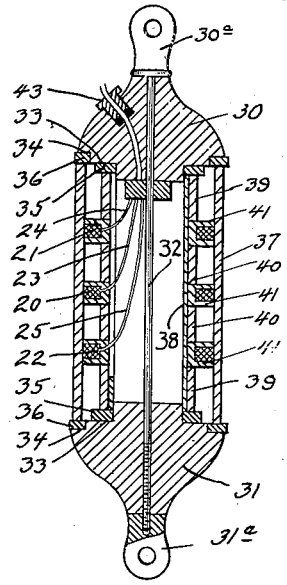
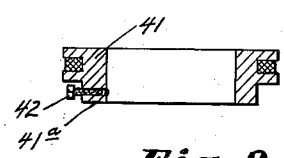
Fig. 1.
Fig. 2.
Fig. 3.
Frederick W. Lee,
Inventor,
by J. F. Motherhead
Attorney.

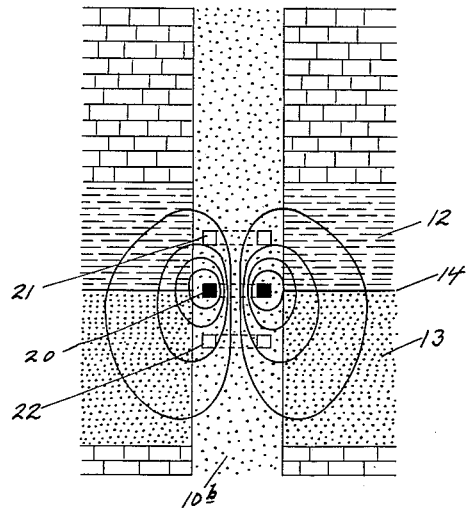
Fig. 4.
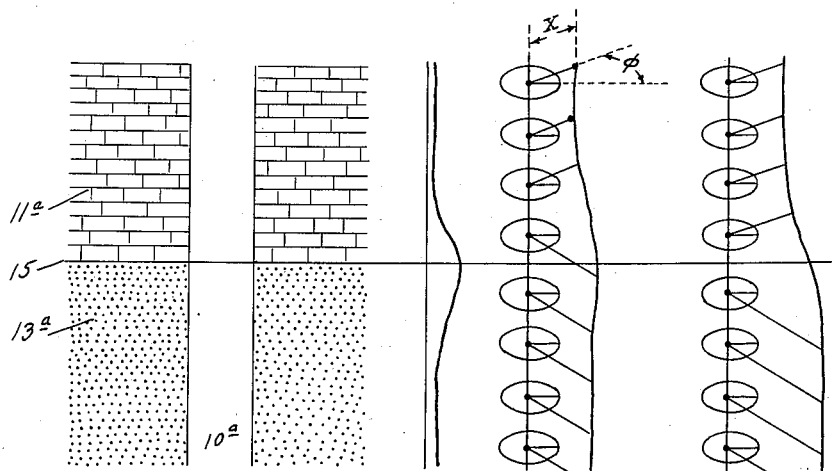
Fig. 5ᵃ.  Fig. 5ᵇ.  Fig. 5ᶜ.  Fig. 5ᵈ.
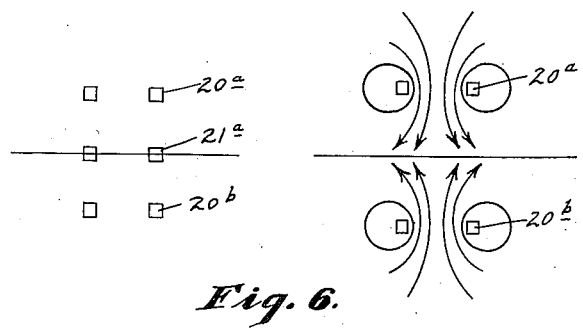
Fig. 6.
Frederick W. Lee,
Inventor,
by J. F. Motherhead
Attorney.

Patented Dec. 2, 1941

2,264,318

UNITED STATES PATENT OFFICE 2,264,318

GEOPHYSICAL SURVEYING

Frederick W. Lee, Owings Mills, Md.

Application April 8, 1938, Serial No. 200,947

8 Claims. (Cl. 175—182)

(Granted under the act of March 3, 1883, as amended April 30, 1928; 370 O. G. 757)

The invention described herein may be made and used by or for the Government of the United States without payment of any royalty thereon.

This invention relates to a method and means for determining by electrical measurements, geological formations and arrangements thereof, herein termed geological structure, in wells, drill holes, and other geological zones to be investigated, and aims generally to improve the same.

Among the objects of the invention, severally, as well as interdependently, are the provisions of a method for geological differentiation by portioning the ground into at least two symmetrically magnetically excited regions and comparing the two regions with each other, thus determining their likeness or difference with respect to one another; and the provision of means for differentiating ground electrical impedances, such as a spaced system of coils which can be positioned in the zone to be investigated. Such coils in the illustrated embodiments herein, are activated by a pulsating magnetic field or by an alternating magnetic field having its origin in a source of alternating current or any other suitable source of energy.

Further objects and advantages of the invention will be apparent from the following detailed description of preferred examples of method and means embodying the same, with particular reference to the accompanying drawings, in which—

Fig. 1 is a diagrammatic representation of circuit arrangements and coils associated with a ground section to be investigated;

Fig. 2 is a sectional view of an illustrative coil assembly unit;

Fig. 3 is an enlarged sectional view of an illustrative coil unit;

Fig. 4 is a diagrammatic sectional representation of the setting up of fields in a medium in accordance with an embodiment of this invention;

Figs. 5a, 5b, 5c and 5d, collectively considered as Fig. 5, represent a further diagrammatic showing of ground structure and simple graphs of magnitude and phase shift data derivable therefrom; and Fig. 6 is a diagrammatic representation on an enlarged scale of parts of the fields created in a medium, in accordance with a modification of the invention.

In the embodiments shown in Figs. 1, 3 and 5, it is assumed that the exciting or field-generating coil is positioned between two exploring coils; while in Fig. 6 is is assumed that a single exploring coil is positioned between two exciting or field-generating coils.

Referring to the embodiment illustrated in Fig. 1, the zone to be investigated is shown as an oil well or bore hole 10 in a geologic formation which may comprise, for example, rock formation 11, shale 12, and sand 13, the boundary plane between the shale and sand layers being indicated at 14.

The exciting and exploring coil assembly, of any suitable form (but preferably of the form hereinafter described in connection with Figs. 2 and 3), is shown in Fig. 1 as comprising an exciting coil 20 and pick-up coils 21 and 22, preferably equally spaced from exciting coil 20 in a symmetrical arrangement, as shown. The exciting coil 20 is supplied with fluctuating or alternating current through paired leads 23, for the purpose of inducing a magnetic field in the material of the zone or medium to be investigated, and the currents induced in pick-up coils 21 and 22 are conveyed through paired leads 24 and 25 to comparison and measuring circuits hereinafter described. To prevent energy being transferred from one coil to another or from outside influences, the leads 23, 24 and 25 are rendered non-inductive and may comprise concentric wires or twisted pairs, for example.

In Fig. 1, the coil configuration 20, 21 and 22 is shown lowered into a drill hole and in proximity with the boundary 14 between the shale 12 and sand or sandstone 13. Under these conditions, the field set-up by the exciting coil 20, as shown in Fig. 4, will be of different shape and density in the sandstone than will the field set-up in the shale, and will accordingly induce different current densities in the respective media. If the sand or sandstone is filled with salt water, the current induced in it will be relatively high with respect to that induced in the shale 12, and the lower coil 22 being in closer proximity with this higher current value will have a higher voltage induced than will exploring coil 21. On the other hand, if the material on each side of the plane of coil 20 (corresponding to plane 14, in Figs. 1 and 4) were the same, then equal voltages would be induced in the two coils 21 and 22. The values of the voltages induced will depend upon the induced currents flowing in the materials indicated as 12 and 13 in Fig. 4. As shown hereinafter, by a system of measurements it is possible to determine the amplitude as well as the phase of the currents induced in the exploring coils 21 and 22. The results so determined are plotted on polar diagrams in Fig. 5, in which is shown a well 10a in a geologic formation comprising limestone 11a and sandstone 13a, separated by a boundary plane 15. The amplitude x and phase angle ϕ, as determined by this invention for respective depths in the geologic structure, are shown for coil 22 on polar diagram Fig. 5c and for coil 21 on polar diagram Fig. 5d. The difference curve resulting when coils 4 and 5 are connected in opposition to one another is shown in Fig. 5b. Because the ground materials are not uniform in their current and voltage relations as well as in their frequency characteristics, this invention contemplates obtaining a differentiation by changing the current density and the frequency of the applied source of power, or either of them.

Another coil arrangement which also permits the securing of similar results with two exciting coils 20a and 20b and one exploring coil 21a, is shown in Fig. 6. In this case coil 20a may first be excited and the voltage of coil 21a measured, after which 20b may be excited and the voltage of coil 21a again measured, and finally, to determine the different field, coils 20a and 20b may be connected in phase opposition, whereupon a difference-field measurement may be obtained by coil 21a.

The symmetrical effects discussed in connection with Fig. 1 will thus again be obtained. It will be appreciated that Fig. 6 may thus be considered an inversion of the previous case.

Decided advantages are obtained by the use of the partitioning arrangement of this invention to directly measure the difference in electrical characteristics at the boundary plane between two beds of material. For example, by this invention definite comparable indications of character are obtainable in spite of the presence in the hole of a casing, drilling mud, or other uniform material, inasmuch as the effect of such uniform material is the same on each coil, while the difference value attributable to it would be zero. Thus, in effect, the presence of such uniform material is not measured.

In order to eliminate secondary currents in the center of the exciting coil, the drilling mud is shielded out by making the frame of the coil hollow or solid and of an electrical material which will not induce secondary currents of an obnoxious order of magnitude.

Furthermore, the form of coil assembly unit preferred is one which will have no projections to impede the sinking of the unit in the well. Illustrative examples of such constructions are shown in Figs. 2 and 3. Referring to Fig. 2, the unit therein shown comprises two conical end members 30 and 31, provided with anchor rings 30a and 31a, and constructed of such material as not to be affected by the exciting fields. The anchor rings 30a and 31a may be made integral with the end members, if desired, but in the form shown, for convenience, are separate therefrom. These two end members embrace between them the exciting and pick-up coils 20, 21 and 22, together with means for excluding mud from the area within the unit, the whole being secured together by suitable means, such as the non-magnetic rod 32, which, in the form shown, is anchored to cap 30 by being made integral with cap 30a, threadedly engaged with cap 31 and locked by threaded engagement with eye member 31a.

The end members 30 and 31 in the form shown are each provided with two concentric shoulders 33 and 34, carrying annular packing gaskets 35 and 36, preferably of less height than the shoulders. The outer annular shoulders 34 and gaskets 36 serve to sealingly embrace or grip an outer mud-shielding cylinder 37, preferably of micarta or other non-magnetic material, within which the coils 20, 21 and 22 or 20a, 21a, 20b, are suitably assembled in spaced relation.

The cable supporting the unit may or may not be or comprise leads 23, 24, 25, which, in any event, are brought out through an insulating packing gland 43. If desired, a weight may be secured to the lower end of the unit for maintaining it vertical.

One preferred mode of mounting the coils, shown in Fig. 2, comprises the assembly with shoulders 33 of a guide tube 38, on which are alternately slipped spacer means, as rings 39 and 40, and coil carrying rings or units 41. Thus, by making spacer means 39 taller and 40 shorter, the spacing of coil units 41 may be varied at will. If desired, the spacer means 39 and 40 may be individually adjustable as to height, for example, using for each of said means a plurality of superposed short cylinders, or thin rings, interchangeable from one means to the other.

Thus, by assembling elements 35 to 41 on one of the end members 30 and 31, and then securing the other end member in place, as by means 32, a mud-tight assemblage is obtained without sacrifice of the ability to vary coil spacings.

Another means for spacing the coil units 41 in the desired manner is illustrated in Fig. 3, in which the means 39 and 40 are replaced by sleeve extensions 41a of the coil units 41, provided with set-screws 42, by which the coils may be immovably secured to the guide cylinder 38 (Fig. 2).

By varying the spacing of the exciting and exploring coils, it is possible to grade or control the influence upon the coils coming from the material in the bore hole. At a very close spacing the radial effect increases. If the spacings are made very large, uncertainties are introduced by the large amount of ground taken into the zone of influence, which makes differentiation less exact. The effect of the material immediately in the neighborhood of the exciting coil, such as drilling mud, water in the well, and the like, is somewhat overemphasized. The best spacing for any given geologic formation and well structure is easily determined by a few test runs, however, and is not particularly critical.

Any inherent minor differences in the several coils may be compensated for by initially adjusting their positions so that the same induced voltage will exist between the two exciting-exploring pairs in air.

The invention further contemplates (as shown in Fig. 1) the employment of a suitable method and means for energizing the exciting coil or coils and for measuring the induced voltages from each exciting-exploring pair.

Various methods and means may be employed; but preferably one which will enable direct reading of ground electrical characteristics, as impedisivities. Fig. 1 accordingly shows, in this special application, a system similar to that set forth in my copending application entitled "Electrical impedisivity or resistivity measuring," filed April 8, 1938, Ser. No. 200,948.

In this system power is supplied to energize the exciting coil 20 (or successively the exciting coils 20a and 20b, Fig. 6) from a suitable intermittent power source 50, such as an alternator, or grid control tube, for example. A transformer or like controlling means 51 permits the adjustment of the exciting current to a preferably predetermined value indicated by the meter 52. This known or predetermined current then passes through a calibrated resistance or impedance 53 to the exciting leads (23 in Fig. 1) through suitable switching means indicated at 54.

A suitable phase shifter 55 is also fed from the intermittent power source 50 through circuits 56 and 57. Proper means 58 and 59 are inserted in the in-put circuits 56 and 57 of the phase shifter to so adjust their relative resistance, capacitance and inductance that the amplitude and phase of the currents in their respective circuits will induce a constant alternating voltage in the phaser out-put circuit 60. A variable resistance 61 in the output circuit 60 serves to regulate the amount of output current, and meter 62 provides for determining its value and constancy.

Preferably the control rheostat 61, and other elements in the circuits, comprise pure resistance without inductance or capacitance, except where shown.

As is also shown in Fig. 1, the controlled and known output of circuit 60 is applied across a suitable potentiometer, which in the form shown comprises a slide wire 63 and lump sections 64, each having a value equal to that of the slide wire.

This potentiometer further comprises an input circuit 65—66, one side of which is connected to means 67 for switching in lump resistance, while the other side is connected to slider 68 operatively associated with the slide wire 63.

To provide for calibration of the potentiometer 63, 64, 67, 68, a switch 69 is provided to supply to the input circuit 65—66 the known potential drop existing across calibrated resistance or impedance 53.

Knowing the potential drop across 53 (which is easily determined from its known resistance or impedance and the current flow as indicated by meter 52), and knowing the proper functional relationship between the constants of the instrument and coils 20, 21, 22, the variable section of the potentiometer 67—68 may be set to the number of potentiometer units corresponding to a known potential input of, say 100 units. The current in the potentiometer 63—64 may then be adjusted by controller 61, and the potential in 63—64 may be brought into phase with that supplied through circuit 65—66, so as to obtain a null reading of a galvanometer 70, located in the input circuit 65—66. In this way the potential drop per unit of potentiometer 63—64 may be so adjusted that the potentiometer scale will read directly the electrical characteristics of the medium in which the well or bore hole 10 is sunk. With the instrument so calibrated, the switch 69 supplying calibrating current may be opened and switch 54 be closed, thus supplying current to exciting coil 20. This current may be adjusted to a predetermined value by means of the adjusting means 51 and 52 above described. If now the switch 71 be closed, and the potentiometer 67—68 and phase shifter 55 be manipulated to obtain a null on null current indicator 70, the values picked up by exploring coil 21 will be directly indicated by the potentiometer scale included between 67 and 68 and by the change of phase indicated by the required adjustment of phase shifter 55. If now switch 71 be opened and 72 be closed, similar indications for coil 22 may be obtained. Finally, if switches 71 and 72 be opened and switch 73 be closed, upon again balancing the potentiometer and phase shifter, the difference values between coils 21 and 22 will be determined.

While any suitable phase shifter may be used, it is preferred, to assure simplicity of design and ease of operation, to employ a phase shifter providing a revolving magnetic field without the use of slotted armatures and which will have the accuracy of a theoretically perfect revolving field.

*Theoretical and mathematical considerations*

To obtain direct reading of ground constants, as above mentioned, certain fundamental mathematical relations are preferably desired.

Referring to Fig. 4, it will be seen that exciting coil 20 produces currents in (1) the drilling mud 10b, (2) the shale 12, and (3) the sand or sandstone strata 13; which induced currents in turn induce voltages in coils 21 and 22.

The mutual induction between the several coils and the effects of the drilling mud remain virtually constant, but the shale will produce a different effect than will sandstone inpregnated with water or oil, for example. Now as the coil configuration is lowered into the hole 10, referring to the plane of coil 20 as determining the position of the configuration, the effect of change of strata will be produced in the lower coil 22, as it reaches proximity to the representative boundary plane 14 (15, Fig. 5). Thus, the phase shift and magnitude indicated for this coil (Fig. 5c) will change before coil 20 reaches plane 15. On further lowering of the coils, similar changes will be observed in the indications obtained from coil 21 (Fig. 5d).

Now as both coils give similar indications when not in proximity to a boundary plane, it will be apparent that the indication of difference between their indications will be relatively small at such time, as shown in the upper and lower portions of Fig. 5b, removed from the plane 15.

But as the indication of one exciting-exploring pair changes before that of the other, as the configuration passes a partition plane 15, at this time the difference will be relatively greater, and the peak difference will closely coincide with the partition plane, as Fig. 5b shows.

Now, designating coils 20, 21 and 22 as $a$, $b$ and $c$, respectively, it will be apparent that the voltage induced in coil $c$ from any current carrying medium will equal the mutual inductance between coil $c$ and that medium multiplied by the current flowing in the medium.

Thus, if $M_{ca}$ = mutual inductance between coil $c$ and coil $a$,
$M_{cm}$ = mutual inductance between coil $c$ and mud,
$M_{cs}$ = mutual inductance between coil $c$ and shale,
$M_{co}$ = mutual inductance between coil $c$ and sand, and $I_a$ = current in coil $a$
$I_m$ = current in mud
$I_s$ = current in shale
$I_o$ = current in sand Then $E_c$, the voltage in coil $c$, will be determined by the formula:

$$E_c = M_{ca}I_a + M_{cm}I_m + M_{cs}I_s + M_{co}I_o$$

(Eq. 1)

Similarly, the voltage $Eb$ in coil $b$ may be determined by the formula:

$$Eb = MbaIa + MbmIm + MbsIs + MboIo \quad \text{(Eq. 2)}$$

Now if the two exciting-exploring pairs are identical, then the mutual induction from each core to the other and to the mud will be equal, so that $$McaIa = MbaIa$$

and $$McmIm = MbmIm \quad \text{(Eq. 3)}$$

Now by connecting the coils in series opposition, thus in effect subtracting Equation 2 from Equation 1, and simplifying by substituting from Equation 3, we find:

$$Ec - Eb = Is(Mcs - Mbs) + Io(Mco - Mbo) \quad \text{(Eq. 4)}$$

In other words, the potential difference equals the current in the sand times the difference in mutual inductance of the two coils thereto plus the current in the shale times the difference in mutual inductance of the coils thereto, and the difference will change with the position of the coil configuration.

Now if $E$ equals applied voltage, and $Zs$ equals configuration impedance giving rise to $Is$, while $Zo$ equals configuration impedance giving rise to $Io$, then:

$$Is = E/Zs$$
$$Io = E/Zo \quad \text{(Eq. 5)}$$

Substituting Equation 5 in Equation 4 and simplifying:

$$\frac{Ec - Eb}{E} = \frac{Mcs - Mbs}{Zs} + \frac{Mco - Mbo}{Zo} \quad \text{(Eq. 6)}$$

Now by adjusting $E$ to a value of 100 units, then $Ec - Eb$ will measure the difference in value of adduced voltages in per cent, and the phase angle is determined directly from the phase shifter.

By embodying a balancing or potentiometer method of measuring the induced voltages (as indicated in Fig. 1) no current flows in coils 21 or 22 under the balanced condition. Thus, no disturbances from such currents are introduced to overshadow the phenomenon to be observed.

In addition, by taking the calibrating voltage supplied through switch 69 from an impedance 53 continuously maintained in the circuit 23 during excitation, uniformity of calibration and exciting settings is facilitated.

The control method and means shown in Fig. 1, as above described, enable measurements to be made with a fluctuating voltage source without disturbing the final results, and the arrangement of control circuits is such as will permit the measurement of the individual voltages, both in magnitude and phase, as well as their sums or differences.

In this way a ground partitioning system is provided with the aid of coils and without making ground contacts directly.

Thus, the several phases, combinations, and subcombinations of the present invention provide for various ones of the following advantageous results, it being understood that if all the results set forth are not desired, only parts of the whole system of method and means need be used;

(1) Geologic structures and the like, and particularly non-magnetic geologic structures can be differentiated with respect to symmetry or lack of symmetry in the direction of the drill hole.

(2) Such structures can be differentiated by the impedance of the structures themselves.

(3) Such structures can be differentiated by a change of the ground impedance due to change of strength of induced ground currents.

(4) Such structures can be differentiated by change of the ground impedance due to change in frequency.

(5) Such structures can be differentiated by directly measuring the difference in amplitude and phase between currents excited in two adjacent portions of the structure.

(6) Such structures can be differentiated at varying depths by controlling the depth of influence as by relative coil adjustments.

(7) Ground constants of such structures may be measured directly by a potentiometer and impedance calibration method and means.

(8) By using a potentiometer system, no current flows in a balanced condition, thereby introducing no disturbance in redistribution of the energy in the ground to overshadow any observed impedance.

(9) The invention provides for impedance measure with a fluctuating source or alternating current voltage.

(10) The invention enables direct measurement of individual indicated voltages as well as sums or differences thereof.

(11) A ground partitioning system is provided for directly reading differences in symmetry of geologic structures and the like.

(12) By repeated measurements at a given configuration position with change of amplitude of current supplied to the exciting coil, the volt-ampere characteristics of the medium may be determined, which is of importance as certain of the materials encountered vary in apparent impedisivity for larger or smaller current flow therein.

(13) By positioning a coil configuration according to this invention near the bottom of a producing well, as by building it into the casing or otherwise, it is possible to determine when water replaces oil in the adjacent sand due to the rapid pumping or other cause.

In connection with mathematical considerations and the details of certain subcombinations of the present disclosure, reference is made to my prior Patent No. 1,951,760, granted March 20, 1934, and to my copending application, entitled "Electrical impedisivity or resistivity measuring," Ser. No. 200,948, filed April 8, 1938; for supplemental and comparative purposes.

I claim:

1. A system for differentiating geologic structure comprising at least one exciting coil and one pick-up coil, said coils being axially spaced one above the other and movable axially relative to a geologic structure, means for exciting said exciting coil with a constant fluctuating current to induce fluctuating current fields in the geologic structure which in turn will induce potentials in the pickup coil influenced by the electrical constants of the structure, and means for measuring the picked up potentials to obtain an indication of the electrical constants of the structure, said exciting means comprising a calibrating impedance providing a potential drop, and said system further including means for applying said potential drop to said measuring means and for calibrating said measuring means to directly indicate, for a given exciting current and coil configuration, electrical constants of the structure.

2. In a geophysical surveying system, means for introducing a current into an earth volume in a predetermined pattern and means for receiving from said earth volume potentials particular to the electrical arrangement of said pattern, means for measuring said potentials, and means for calibrating said measuring means comprising an impedance in said current introducing means, means for applying the known potential drop across said impedance to the potential input of said measuring means, and means for adjusting said measuring means to multiply said known input potential by such factor as to give a direct reading based upon the input potential and the electrical constants of the geologic medium in said pattern.

3. A device of the class described, comprising a unit made up of a pair of end members, a guide means and an outer mud-shield member embraced thereby, a plurality of coils adjustably positioned on said guide means and within said mud shield, and a packing means and leads extending from said coils to the exterior of the unit therethrough.

4. A device according to claim 3, said coils being adjustably positioned by means of spacer rings also positioned on said guide means.

5. In a system of the class described, the combination with means including an energizing circuit for producing an electric field in an earth volume in a predetermined pattern, means including a potential circuit for receiving from said earth volume potentials particular to the electrical arrangement of said pattern, and means for measuring said potentials; said energizing circuit comprising a source of current and means for adjusting said current to a known value, and said potential measuring means comprising a potential balancer having an input circuit; of means for calibrating said potential measuring means comprising an impedance connected in said energizing circuit producing a voltage drop related to the known adjusted value of the current therein, means for connecting the input circuit of said balancer to receive the voltage drop of said calibrating impedance, and means for adjusting the scale of said potential balancer to a predetermined relation with said calibrating voltage drop; and means for connecting said adjusted potential balancer to said potential circuit; whereby the scale of received potential measurement is rendered definitely related to the current flowing in said energizing circuit.

6. A system according to claim 5, in which a common current source is connected as the source of current for said energizing circuit and as the source of balancing current for said potential balancer for which it further comprises the current source creating the calibrating potential.

7. A system according to claim 5, in which a common fluctuating current source is connected as the source of current for said energizing circuit and as the source of balancing current for said potential balancer for which it further comprises the current source creating the calibrating potential, and in which said potential balancer includes both magnitude and phase balancing means.

8. A system according to claim 5, in which the potential drop per unit of the potential balancer is so adjusted to the calibrating potential as to read directly the electrical characteristics of the earth volume embraced in the predetermined pattern.

FREDERICK W. LEE.